Jan. 10, 1928. 1,655,571
C. A. SIMS
SIDE LAMP FOR AUTOMOBILES
Filed Dec. 13, 1926
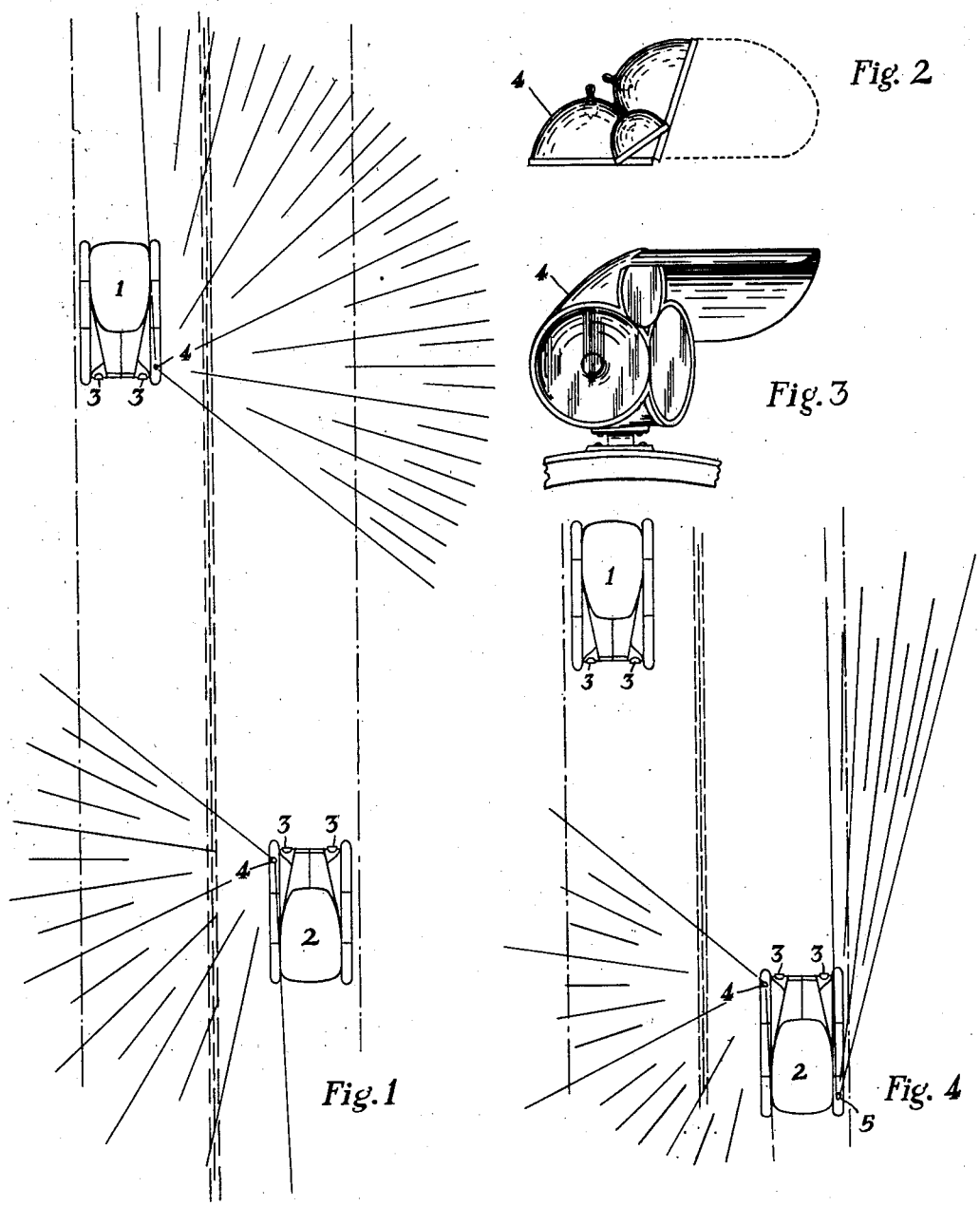
Inventor:
Charles A. Sims.

Patented Jan. 10, 1928.

1,655,571

UNITED STATES PATENT OFFICE.

CHARLES A. SIMS, OF ODON, INDIANA.

SIDE LAMP FOR AUTOMOBILES.

Application filed December 13, 1926. Serial No. 154,535.

This invention is designed as an improvement upon my previous Patent No. 1,578,772 issued March 20th, 1926.

The lamp patented March 20th, 1926, No. 1,578,772 consists of two lamps in one housing, whose reflectors intersect each other at their outer edges. When mounted upon the left front fender of an automobile it would illuminate the roadway to the rear and side of the car, but the space on roadway between the direct rays of light from each lamp was poorly lighted.

The new lamp described in this application has a third lamp above and between the two lower lamps which casts its light rays obliquely, rearwardly, and illuminates the semidarkened area on roadway.

As is well known the glare of automobile headlights is extremely confusing to the driver of passing cars, and even when dimmed, the turning off of the brilliant lights leaves the eyes in such a partially blinded condition that the surrounding darkness is quite impenetrable and the cars pass each other without either driver being able to see the road ahead of him.

The object of my invention is to turn out the headlights and simultaneously and automatically switch on lights on the side where the opposite car passes that will fully illuminate the road not only at the side of the car being passed but far enough in the rear to disclose another car behind, a bridge, or turn in the road, or in other words, to fully disclose the roadway and any dangers that may exist for the car about to pass over it. So far this was never done before I did it.

I accomplish the above and other minor objects that will hereinafter appear by the means more or less diagrammatically illustrated in the accompanying drawings, in which, Fig. 1 is a diagram in the top plan view of two automobiles passing each other and both equipped with my invention;

Fig. 2 is a view in horizontal top view of side lamp adapted to illuminate at the side and rear of the car.

Fig. 3 is a side elevation of the lamp showing a visor used when the lamp is mounted near the front of the car so that the visor will prevent the light from striking the driver within.

Fig. 4 is a diagram in top plan view of two automobiles passing each other when one car is not equipped with my lamp.

Lamps 4 in Figure 1 are located on the front fender where light will illuminate the roadway at the side and rear of the car. I have here shown it as located on the front fender, which I regard as the most suitable place to obtain support and to effectively illuminate the roadway to the side and rear of the car. There may be a group of separate lamps with appropriate reflectors, or, as here shown, a triple bulb lamp with appropriately designed reflectors may be employed, at a saving in current to operate it, and for the simplifying of the wiring and the switch mechanism.

In the lamp 4 as here shown, there are three reflectors whose outer edges intersect each other at three places and so arranged to cast the light upon the roadway that the roadway will be illuminated to the side and well toward the front of the car and to the rear and back of the car so that the driver of the passing car can readily see the roadway to the side and rear of the car he is passing. One-half of the roadway to rear of the car bearing my device is fully lit up for 200 feet or more. Location of the lamp 4 at top of the front fender, is quite important for the best results, as it leaves half of the roadway in rear of the car dark and does not glare in the eyes of a driver following. I prefer to leave the right hand front lamp on where the passing car is not equipped with my invention, in order that the driver of the car so equipped may see to pass it. Or a still better means would be to install an additional lamp on the right hand rear fender, where the body of the car prevents it from glaring into the eyes of the approaching driver, and yet illuminates the roadway in front of the car.

See Fig. 4.

When one car approaches another not equipped with my lamp, the driver can, with same switch, turn off his headlights and automatically switch on these two side lamps, which illuminate the roadway to side and rear on the left hand side of his car and to the front, on right hand side. The approaching driver upon seeing the headlights disappear and the side lamps illuminating the way for him far in rear of the car he is meeting should then turn off his head-lights which would allow the driver of the car equipped with my device to see his way past the approaching car. Where all cars are equipped with my device the headlights on both cars should be entirely switched off. The rear illumination is also of great advantage when the driver desires to back his car.

All of the lamps are appropriately wired to a switch so designed that a single lamp, or two or more lamps in any selective grouping, at the will of the driver of the car may be illuminated. This switch bears appropriate legends (not shown) to instruct the driver in connection of the lamps.

All of the above parts may be modified in a manner known to those skilled in the arts to which they belong without departing from the spirit or principle of this invention.

Having thus fully described my invention and the manner of its use, what I claim as new and wish to secure by Letters Patent is—

A side lamp for automobiles, comprising three projecting reflectors each one of which intersects the other two at their outer edges and each reflector having an independent light source at its focus, said lamp being adapted to be mounted upon a motor vehicle in such a manner that light from one will be directed rearwardly, from another laterally, and from another obliquely rearwardly.

Signed at Odon, county of Daviess, State of Indiana, this the 9th day of December, 1926.

CHARLES A. SIMS.